July 9, 1968  R. DEFLANDRE  3,391,605

MACHINE-TOOL FOR BIDIRECTIONAL COPYING PARTS OF REVOLUTION

Filed Feb. 21, 1966  12 Sheets-Sheet 1

July 9, 1968      R. DEFLANDRE      3,391,605
MACHINE-TOOL FOR BIDIRECTIONAL COPYING PARTS OF REVOLUTION
Filed Feb. 21, 1966      12 Sheets-Sheet 2

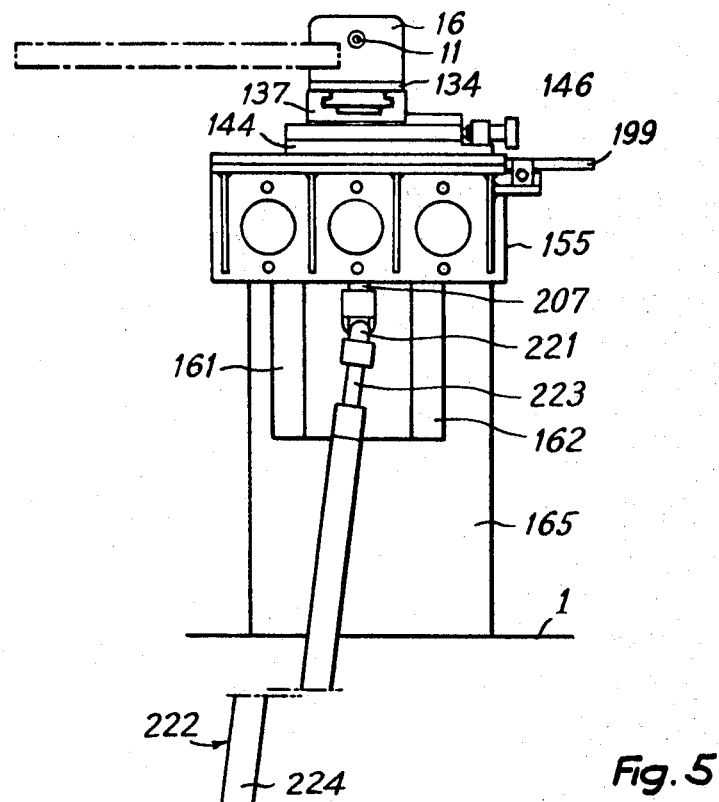
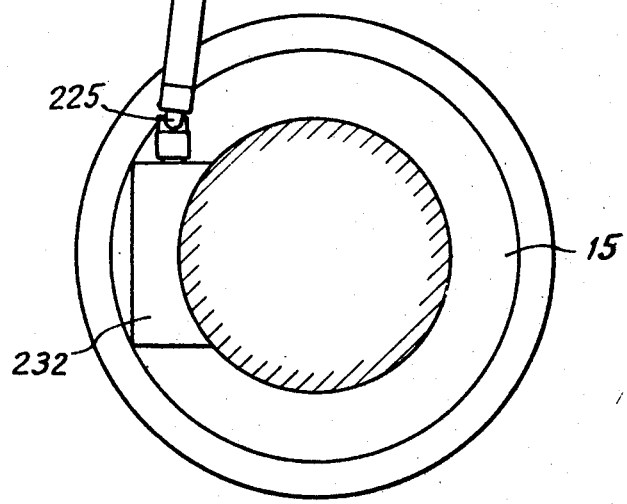
Fig. 5

July 9, 1968  R. DEFLANDRE  3,391,605
MACHINE-TOOL FOR BIDIRECTIONAL COPYING PARTS OF REVOLUTION
Filed Feb. 21, 1966  12 Sheets-Sheet 9
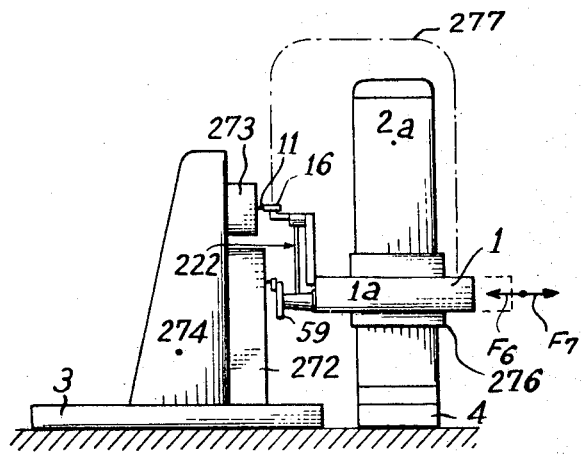
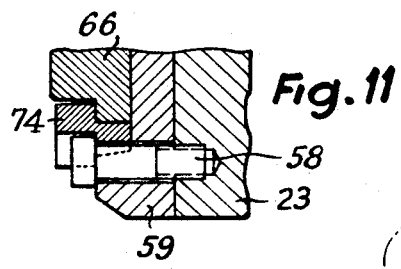
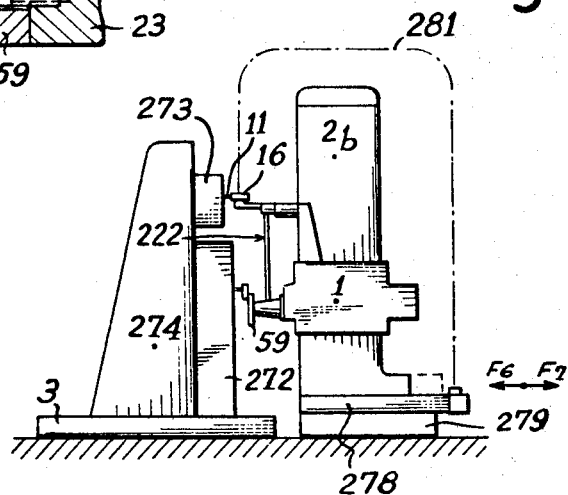

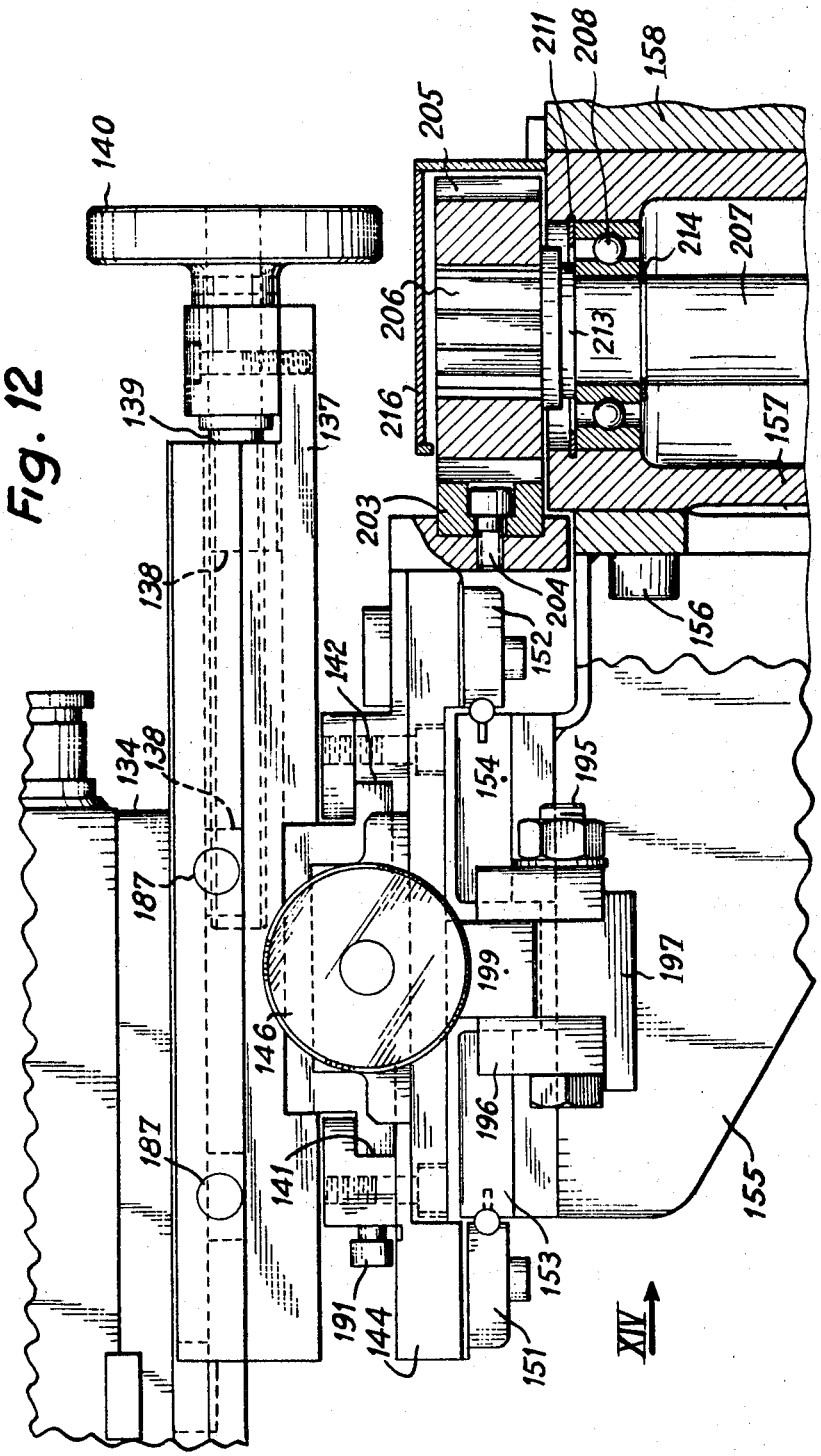

July 9, 1968  R. DEFLANDRE  3,391,605
MACHINE-TOOL FOR BIDIRECTIONAL COPYING PARTS OF REVOLUTION
Filed Feb. 21, 1966  12 Sheets-Sheet 11

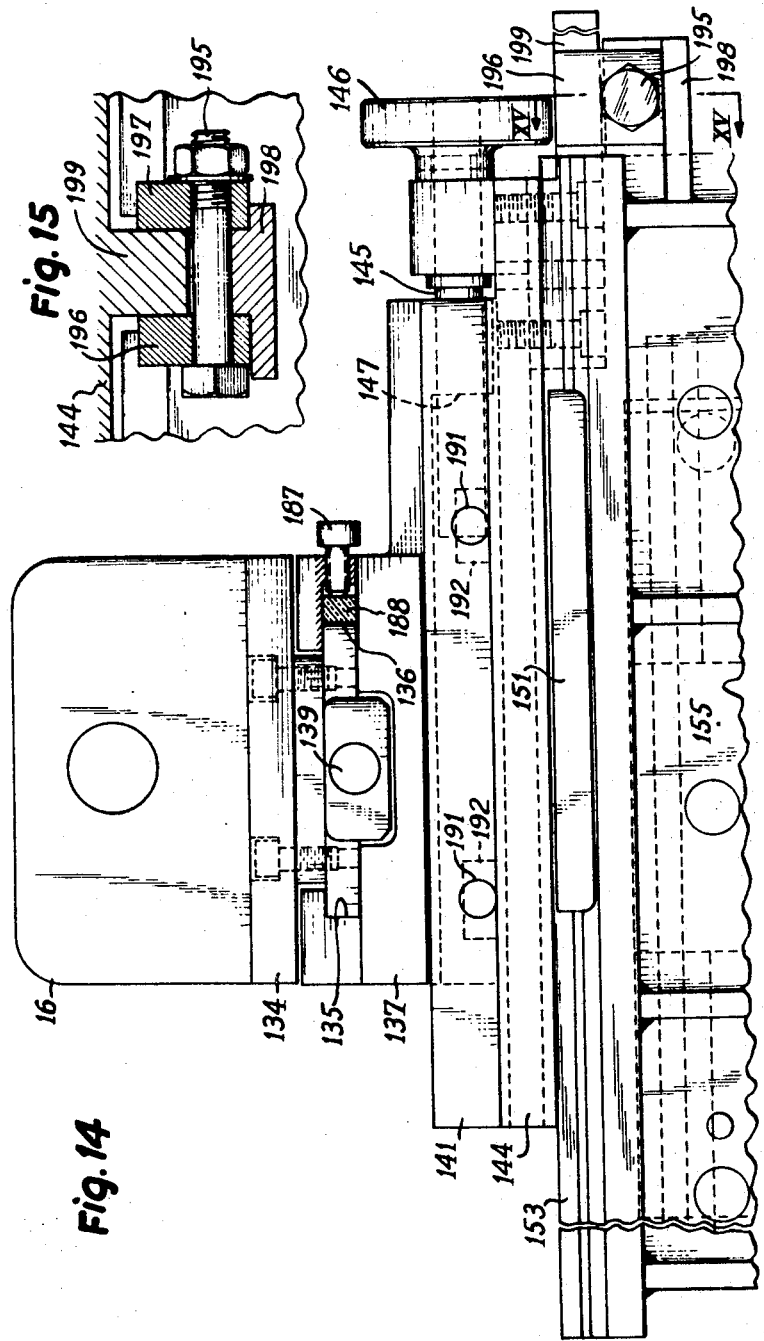

United States Patent Office 3,391,605
Patented July 9, 1968

3,391,605
MACHINE-TOOL FOR BIDIRECTIONAL COPYING PARTS OF REVOLUTION
René Deflandre, Paris, France, assignor to Societe dite: DEREFA, Etablissement pour le Developpement, Recherches et Fabrications Industrielles, Vaduz, Liechtenstein
Filed Feb. 21, 1966, Ser. No. 528,985
Claims priority, application France, Feb. 24, 1965, 6,771
7 Claims. (Cl. 90—13)

ABSTRACT OF THE DISCLOSURE

The machine tool herein is composed of two supporting members, on one of which are mounted a rotating facing head plate provided with a radially movable slide for carrying the tool, and a feeler support which moves on the supporting member in a direction orthogonal to the axis of the facing head plate. The other supporting member carries the part to be machined by the tool and a template to be traced by the feeler. The two supporting members are movable with respect to each other in a direction parallel to the axis of the facing head plate. Means are provided between the feeler holder and the means for radially feeding the slide to control such radial feed, and means are provided for synchronizing the direction of movement of the two supporting members with such radial feed of the slide.

---

Figure 1:
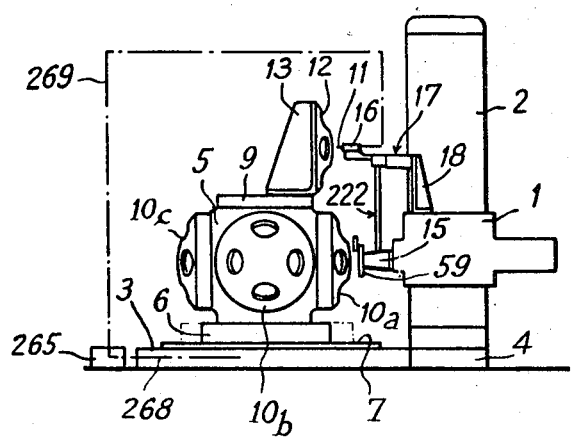

Generally speaking the machining of parts of revolution is effected by copying on centre or vertical lathes. The part to be machined is then centred and fixed to the face-plate of the lathe and the template, which is carried by the machine frame, while the cutting tool and the feeler are carried on a movable slide and moved simultaneously in a direction parallel to the axis of the workpiece holder under the action of a suitable drive and crossways in response to impulsed movements effected by the feeler as it traces around the template during the driven movement.

Although this process is simple when the parts to be machined are of moderate size and particularly when the shape to be copied for parts of revolution is coaxial to the axis of revolution of the part, this process is no longer so easy when the parts to be machined are of large dimensions and is particularly difficult when the parts do not rotate about an axis which coincides with the axis of the shape to be traced and copied. In fact, these parts may exceed the capacity of the lathe or, by reason of their lack of symmetry, cause a lack of balance which is very prejudicial to the precision of the work.

In an attempt to overcome these difficulties, a machine was proposed in which the part to be machined remains fixed while the tool, which in this case is a rotating tool, and the feeler, are driven to effect rectilinear movements in two different directions under the action of two control devices which are separate from each other but synchronised by electric or electronic means. A system of this type is very cumbersome and does not always give the degree of precision required, particularly due to the amount of play in the movement-transmitting linkages, and especially when the direction of movement is being reversed.

The invention has for an object a machine which enables a machining operation of this type to be effected without, or substantially without, the disadvantages above described in relation to machines of the prior art.

To this end, the machine of the invention comprises a first supporting member on which are mounted a rotating plate or facing head provided with a facing head slide, which advances radially over the said plate, and a moveable support for the feeler which moves on the first supporting member in a direction orthogonal to the axis of the facing head. A second supporting member supports both a part which may be machined by the tool carried by the facing head slide and a template which may be traced by the feeler, the first and second supporting members being movable with respect to each other in a direction parallel to the axis of the facing head. Means are also provided for ensuring the radial feed movement of the facing head slide together with a simple mechanical connection between the feeler holder and the means controlling the radial feed of the facing head slide and means for ensuring the relative movement of the two supporting members above mentioned in an appropriate direction in response to the impulsed movements received by the feeler as it traces around the template in the course of the movement effected by the feeler holder synchronously with the radial feed movement of the facing head slide.

This design makes it possible for parts of very large dimensions and of any shape to be machined, including parts which do not posses axes of symmetry, since the parts are not rotated and consequently cannot produce disequilibrium or pass through spatial areas which cannot be encompassed by the machine. Furthermore, the direct mechanical connection between the feeler holder and the member controlling the radial feed movement of the facing head slide reduces to an absolute minimum the effect of play in the accuracy of the copying process.

In an advantageous embodiment, the machine is a combined milling and boring machine with a horizontal spindle coupled to the facing head, the spindle head and a floor plate constituting the first and second supporting members above mentioned.

In one embodiment, the second supporting member is constituted by a plate which is movable on the floor plate in a direction parallel to the axis of the spindle.

In another embodiment, the spindle head is able to move horizontally in a direction parallel to the axis of the spindle on a plate which slides on an upright column and the second supporting member is mounted in a fixed position on the floor plate.

In yet another embodiment, the spindle head is mounted so as vertically to slide on an upright column which is itself able to slide horizontally on a slideway parallel to the direction of the machine spindle, the second supporting member being mounted in a fixed position on the floor plate.

In a particular embodiment of the invention, the feeler holder is held on a slide which is able to move on a slideway extending in a direction orthogonal to the axis of the facing head and which is provided with a rack engaging with a toothed pinion mounted at one end of a cardan shaft, the other end of which carries another pinion which is similarly toothed and engages with a rack connected to a member which forms part of the means controlling the radial feed movement of the facing head slide.

In a particular embodiment, the said member which controls the radial feed movement of the facing head slide is the boring spindle of the machine.

Figure 2:
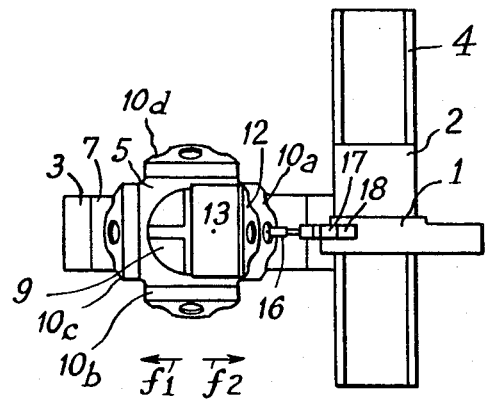
Figure 3:
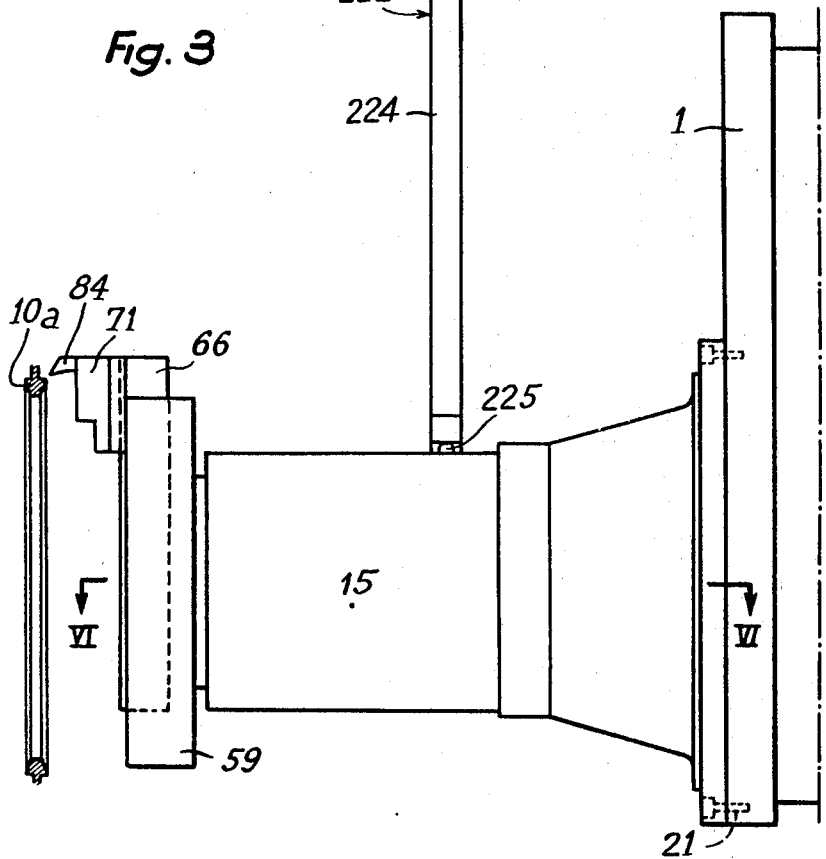
Figure 4:
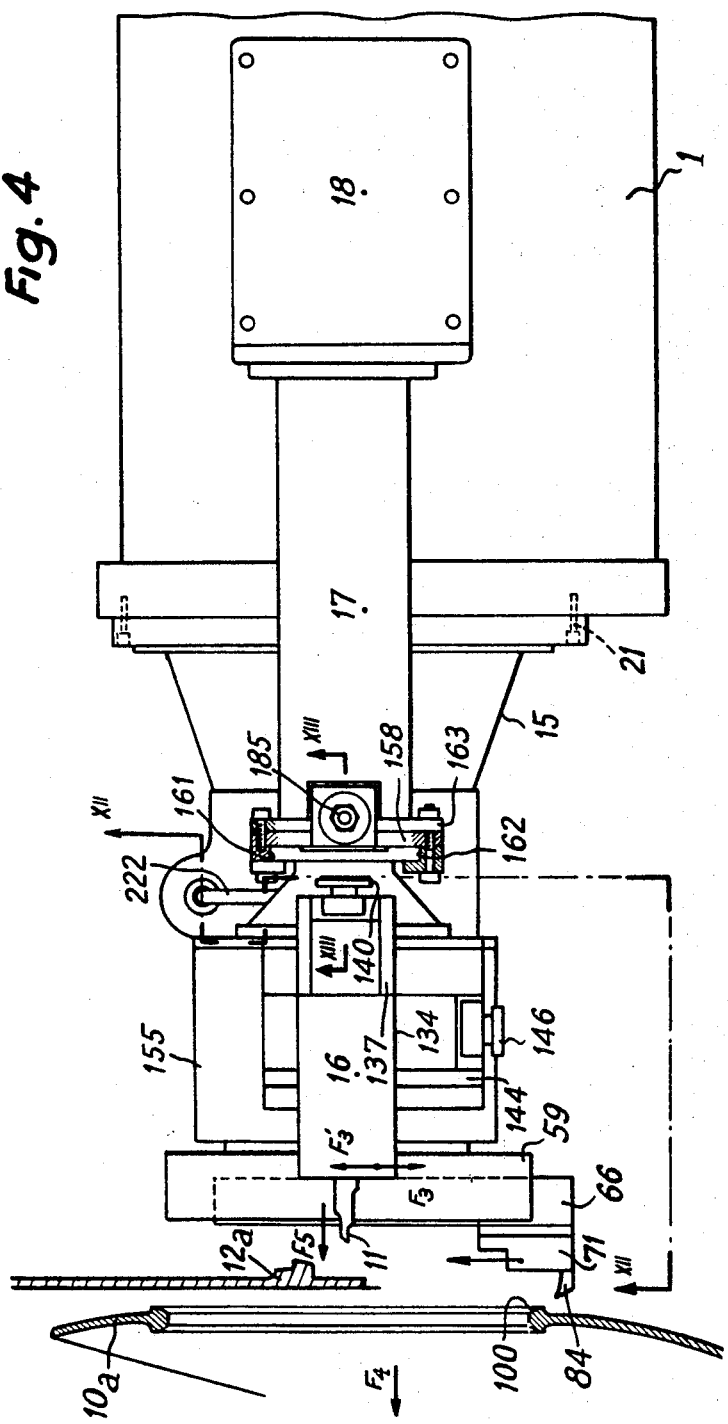
Figure 6:
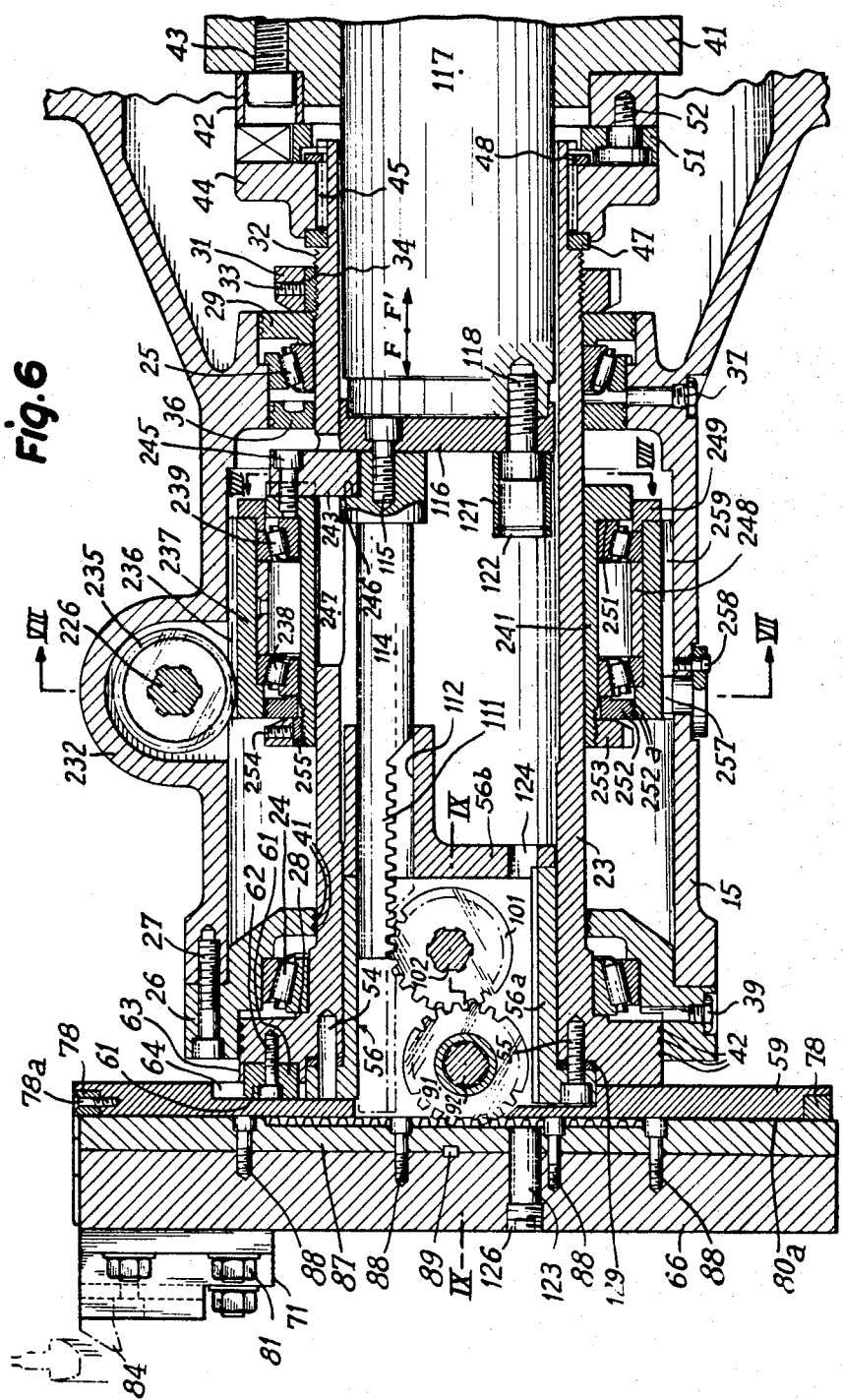
Figure 7:
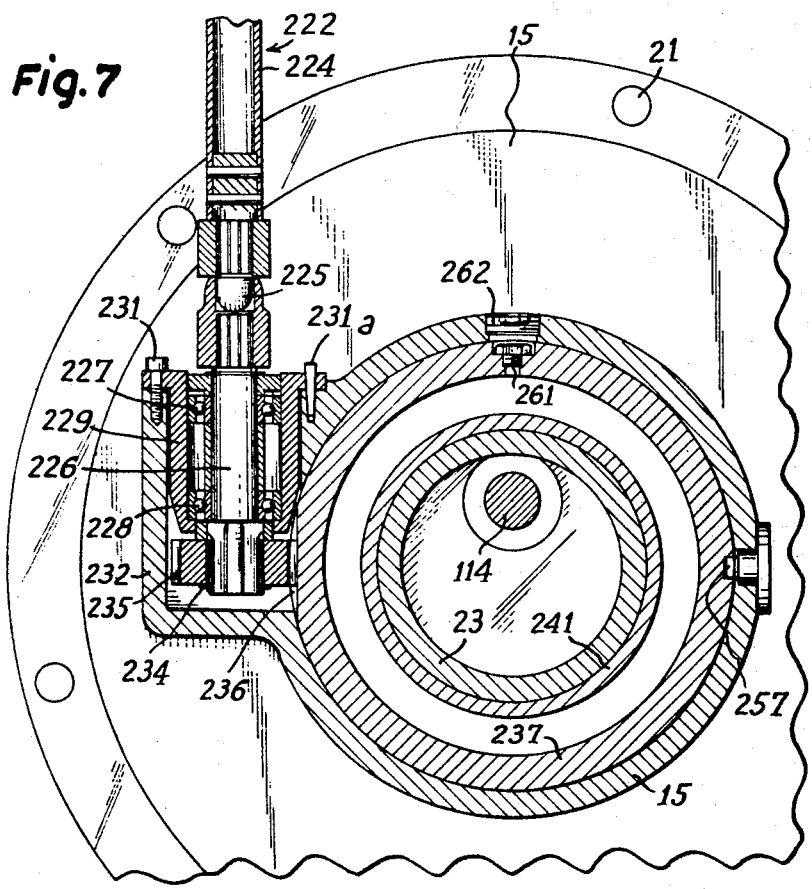
Figure 8:
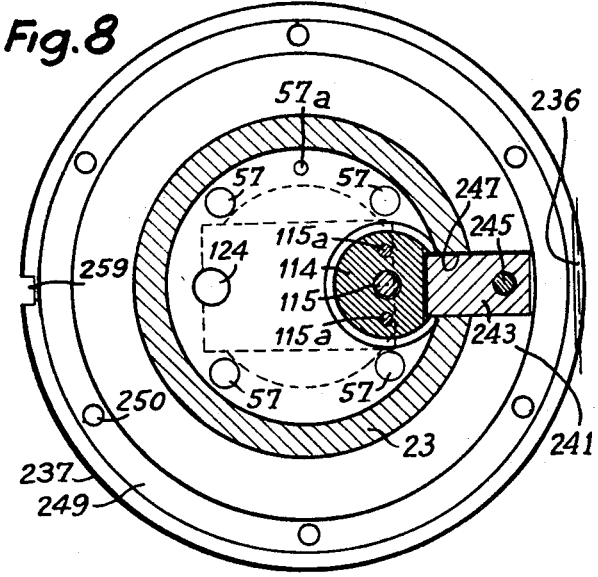
Figure 9:
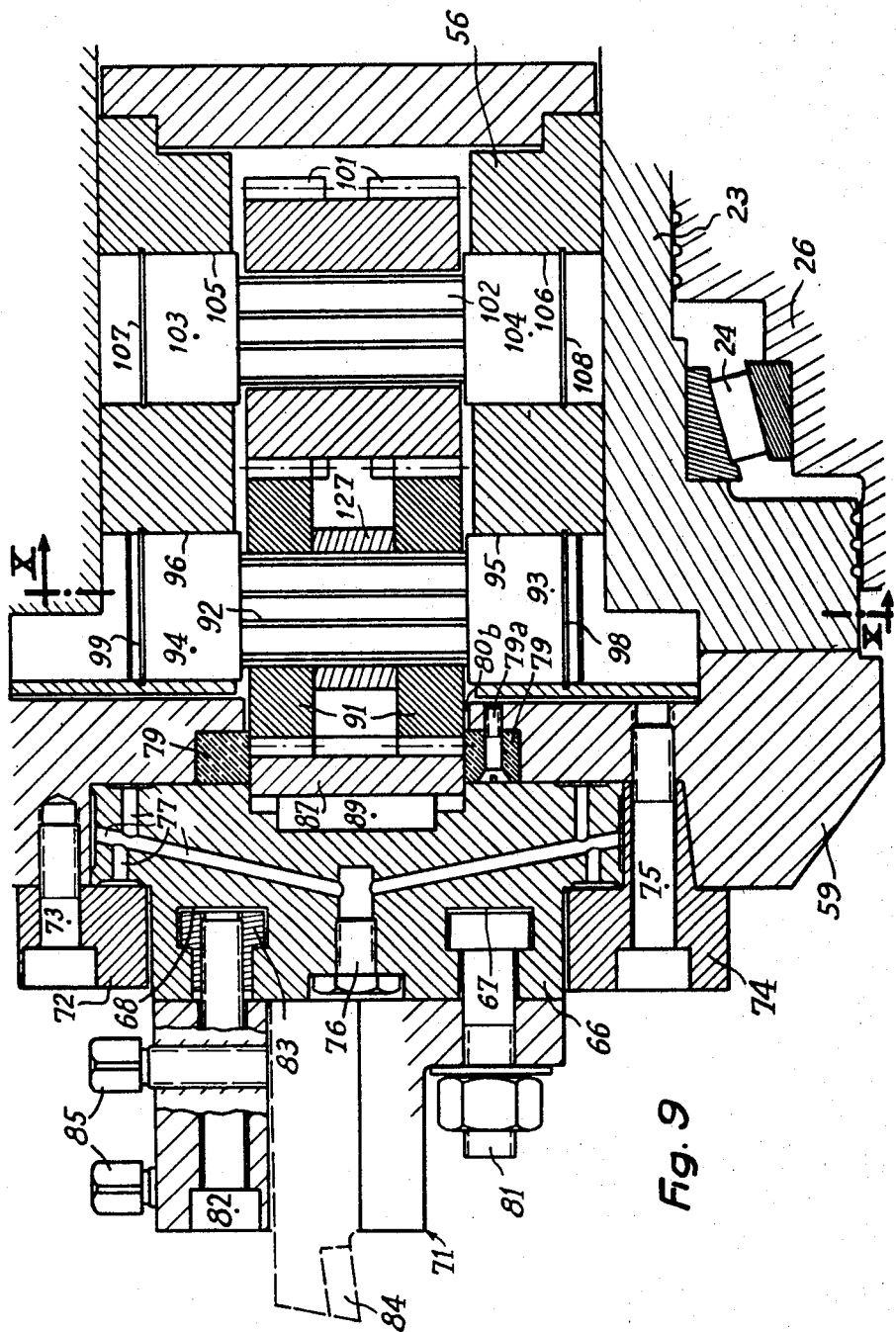
Figure 10:
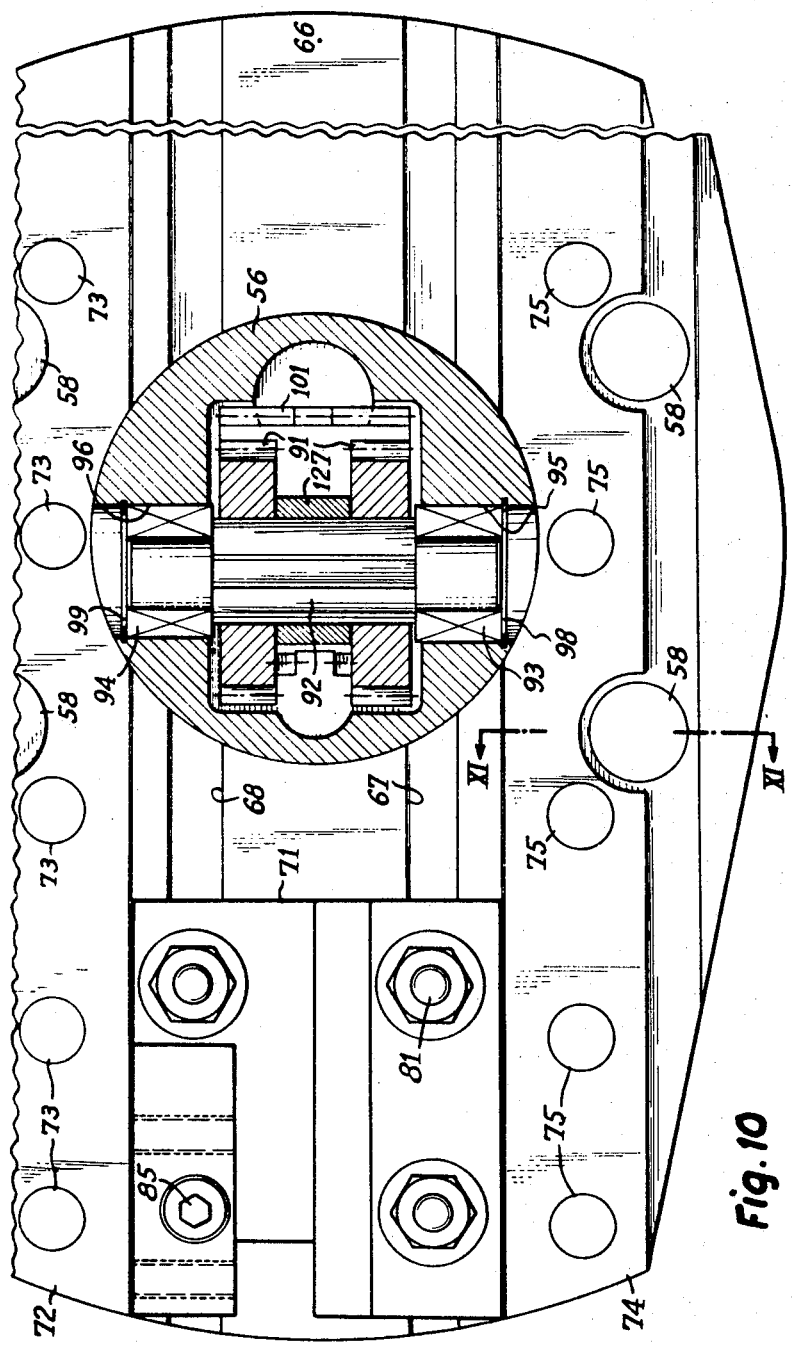
Figure 13:
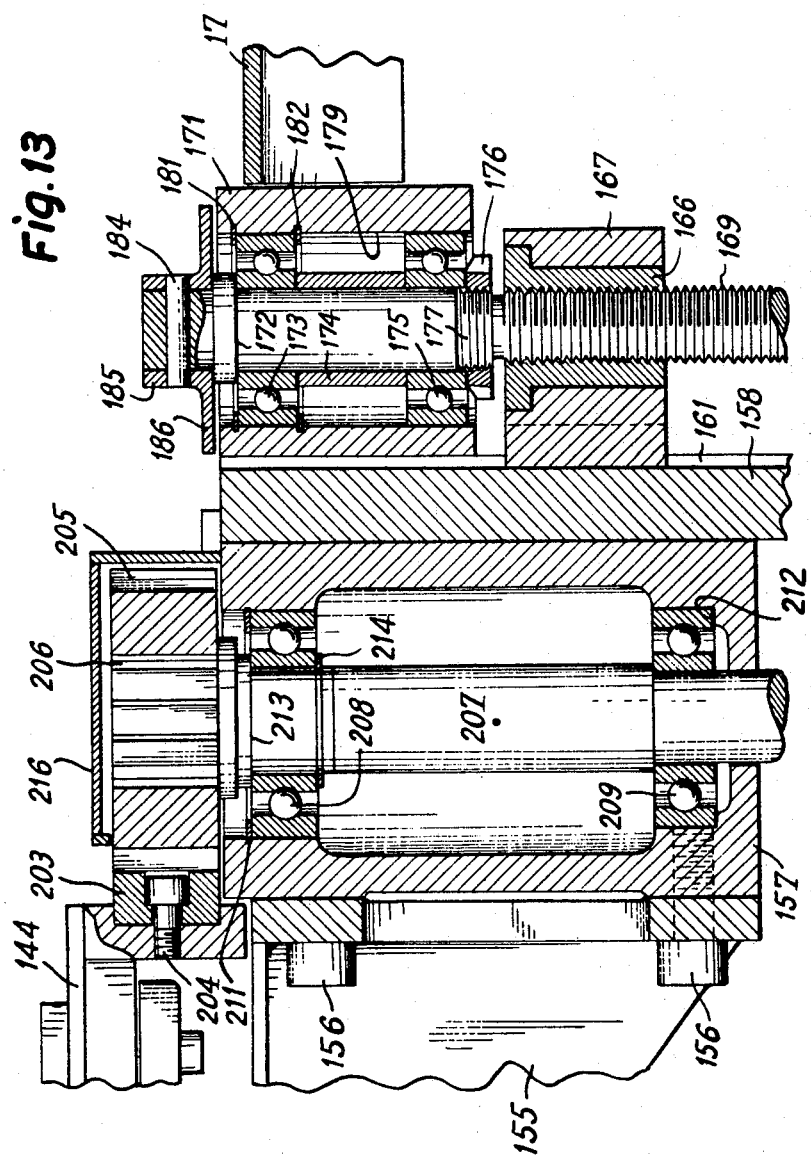

In order that the invention may be more clearly understood, reference will now be made to the accompanying drawings which show, by way of example, a number of embodiments of copying machines according to the invention, and in which:

FIGURE 1 diagrammatically represents a front view of a copying unit according to the invention located on a combined milling and boring machine of the horizontal type with a floor plate carrying a work-piece holder and a template holder, FIGURE 2 is a plan view of the device shown in FIGURE 1, FIGURE 3 is an elevational view, to a larger scale, of the main part of the device shown in FIGURE 1, FIGURE 4 is a plan view of the device shown in FIGURE 3 when the facing head has been rotated through 90°, FIGURE 5 is a sectional view in the direction of the arrow V in FIGURE 3, FIGURE 6 is a sectional view to a larger scale along the line VI—VI in FIGURE 3, also after the facing head has been rotated through 90°, FIGURE 7 is a sectional view along the line VII—VII in FIGURE 6, FIGURE 8 is, to a slightly increased scale, a sectional view along the line VIII—VIII in FIGURE 6, FIGURE 9 is, to a yet larger scale, a sectional view along the line IX—IX of FIGURE 6, FIGURE 10 is a sectional view along the line X—X in FIGURE 9, the facing head, which is located in front of the plane of the section, being shown in a front elevational view, FIGURE 11 is a sectional view along the line XI—XI in FIGURE 10, FIGURE 12 is a view, to a larger scale, of the upper portion of FIGURE 3. FIG. 13 is a sectional view taken along the line XIII—XIII in FIG. 4, FIGURE 14 is a side view in the direction of the arrow XIV in FIGURE 12, FIGURE 15 is a sectional view along the line XV—XV in FIGURE 14, FIGURE 16 is a modification of the copying unit shown in FIGURE 1 applied to a boring machine with a floor plate on which are secured the template and the parts to be machined, while the tool and the feeler are carried by a support which is able to move horizontally on a plate which slides along an upright column, and FIGURE 17 shows another modification in which the template and the work-piece are secured to a floor plate while the feeler and the tool are carried by a support which is able to move vertically along an upright column which in turn is able to slide horizontally on a bed.

Referring now to the drawings, in the first embodiment shown diagrammatically in FIGURES 1 and 2, the machine tool is a combined milling and boring machine with a horizontal tool spindle mounted in a headstock 1, able to move vertically along an upright column 2. The parts to be machined, such as 10a, 10b, 10c, 10d, are fixed against the side faces of a rotating device 5 which is able to turn about a vertical axis on a slide 6 which slides horizontally on a plate 7 in the direction indicated by the arrows f1 and f2, the plate 7 being fixed on the floor plate 3 of the machine. The rotating support 5 for the work-pieces is also provided at its upper portion with a plate 9 which does not rotate and which serves to support a template or model part such as 12 by means of an angle bracket 13 in the example shown. The whole rotating device which carries the work-piece may be of the type described and shown in the French patent application filed by DEREFA Etablissement pour le Developpement, Recherches et Fabrications Industrielles on Aug. 6, 1964, Serial No. 984,329, under the title, "Rotary support for parts to be machined."

The upright column 2 is mounted on a bed which is substantially at right angles to the floor plate 3.

The tool for succcessively cutting the work-piece such as 10a is mounted in a unit carried by a barrel 15 fixed to the front face of the stock 1, while the feeler 11 is mounted in a holder 16 carried by an arm 17 secured to a bracket 18 fixed to the upper face of the stock 1, the tool and the feeler being positively connected by a mechanical connection which will be described in detail below.

The barrel 15 is fixed against the front face of the stock by screws 21 (FIGURES 3 and 4). Within the barrel is mounted a hollow rotating spindle 23 (FIGURE 6) on two conical roller bearings 24, 25 arranged adjacent either end of the spindle. The outer raceway of the bearing 24 is located in a casing 26 fixed in the outer end of the barrel 15 by means of the screw 27, while its inner raceway abuts against a shoulder 28 on the spindle. The outer raceway of the bearing 25 is directly inserted in a recess in the barrel 15, while its inner raceway abuts against one face of a sealing ring 29; the spindle 23 is held in position in its two bearings by means of a nut 31 screwed on to the threaded portion 32 of the said spindle and abutting against the other face of the sealing ring 29. This arrangement permits the two bearings to be pre-stressed. The nut 31 is provided with a brake formed by a screw 33 which rests on a collar 34 of copper which rests on the threaded portion 32 of the spindle.

At the side of the bearing 25 located opposite the sealing ring 29 there is arranged another sealing ring 36 and the lubricant required for this bearing is introduced through a lubricator 37.

The lubricant required for the other bearing 24 is introduced through a lubricator 39 and is retained by the annular sealing grooves 41 provided in the base of the casing 26 and by the annular sealing grooves 42 in the corresponding end of the hollow spindle 23.

The hollow spindle 23 is rotated by the milling spindle by means of an Oldham coupling which comprises a flange 42 secured to the milling spindle 41 by screws 43 and a flange 44, the inner bore of which has ribs 45 which engage with cooperating ribbed portions provided in the corresponding end of the hollow spindle 23, on to which it is threaded. A two part ring 47 serves as an axial stop member for the flange 44 which is held by an elastic keeper ring 48 arranged in an annular groove in the spindle 23.

The Oldham washer 51 is held against the flange 42 by means of screws such as 52 and serves to couple the two flanges 42 and 44 and thus the hollow spindle 23 holding the milling spindle 41.

A sleeve 56 is centered and fixed in the outer end of the hollow spindle 23 by means of screws 56 and positioning fingers 54. The sleeve 56 is composed of two pieces 56a, 56b which are fixed one within the other by means of screws 57 (FIGURE 8) and a pin 57a. A facing head 59 is centered on the end of the sleeve 56, which projects slightly beyond the corresponding end of the hollow spindle 23, and is secured by screws 58 (FIGURES 10 and 11). The facing head 59 is drawn in a peripheral direction by the hollow spindle 23 through two tangs such as 61, only one of these tangs being visible in FIGURE 6, which are each fixed to the spindle 23 by screws 62 and are lodged both in a radial groove 63 of the spindle and a radial groove 64 in the facing head.

The facing head 59 carries a slide 66, the external face of which is grooved as shown at 67, 68 in FIGURES 9 and 10, which grooves are of a T-shaped cross-section and serve to secure a tool holder such as 71. A collar 72, fixed in place by screws such as 73, and a positioning collar 74 secured by screws such as 75, enable the slide 66 to move in a fixed path across the facing head 59. A lubricator 76 (FIGURE 9) supplies lubricant through a duct 77 to the slideway of the slide 66 so that its travel over the facing head is smooth and regular.

Two gun-metal rods 78 (FIGURE 6) are secured by means of screws 78a to the facing head 59, while two other rods 79 (FIGURE 9) are fixed by means of screws 79a to the same head and prevent dust and turnings from penetrating into the hollow spindle 23 through the gaps shown at 80a and 80b.

By way of example, the tool holder has been shown mounted on bolts such as 81, the head of which engages in the groove 67 of the slide 66, and by means of screws such as 82 threaded into the square-headed screw 83 which engage in the groove 68. A cutting tool 84 is shown locked in the tool holder by means of screws such as 85.

The sliding movement of the slide 66 on the facing head is ensured by a mechanism comprising a rack 87 (FIGURES 6 and 9) secured to the said slide by screws 88 and positioned thereon by means of a tang 89.

The rack 87 is locked in engagement with a pair of pinions 91 (see also FIGURE 10) mounted on a splined shaft 92 which pivots at its two ends in two bearings 93, 94 which are fixed in two coaxial recesses 95, 96 in the sleeve 56 by means of two elastic keeper rings 98, 99 which engages in corresponding annular grooves in the recesses.

The two toothed pinions 91 mesh with the two twin teeth of another toothed pinion 101 which is mounted in a similar manner on a splined shaft 102 supported in two bearings 103 and 104 located in two corresponding coaxial recesses in the sleeve 56 in which they are held by means of two elastic keeper rings 107 and 108.

The toothed pinion 101 is rotated by means of a rack 111 (FIGURE 6) which is of a substantially cylindrical section and slides in a longitudinal bore 112 in the sleeve 56. The rod portion 114 of the rack 111 is fixed by means of a screw 115 and two positioning fingers 115a (see also FIGURE 8) to a plate 116 which is in turn fixed to the end of the sliding boring spindle 117 of the machine by means of screws such as 118. For convenience during assembly, the head of each screw 118 is enclosed in a cylindrical cage 121 which is of sufficient length for the threaded portion of the screw to be releasable from the boring spindle 117, while an elastic keeper ring 122 is lodged in an annular groove in the internal wall of the cage adjacent its open end and prevents the said screw from dropping during removal. Access to this screw is through a hole 123 in the slide 66 and a hole 124 in the base of the sleeve 56, and by means of a long spanner. The hole 123 is provided with a closure stopper 126. The two toothed pinions 91, are separated from each other by a cross-piece 127 (FIGURE 9) in order to allow access to a spanner.

A washer 129 is inserted between the end faces of the casing 56 and the sleeve 23 adjacent each other, the thickness of the washer being determined carefully so as to ensure that the rack 87 and pinions 91 engage without clearance.

Any axial movement of the boring spindle 117 of the machine thus results, through the movement-transmitting linkage constituted by the rack 111, the toothed pinions 101 and 91 and the rack 87, in a corresponding movement of the slide 66 on the radial slideway of the facing head 59. In the example shown, the pinions 91 and 101 are of the same diameter so that the ratio of movement of the boring spindle 117 to the slide 86 is 1:1.

The feeler holder 16 is secured to the upper part of a horizontal slide 134 (FIGURES 3, 4, 5, 12 and 14) which moves on a slideway 135, 136 of the slide 137, under the action of a conventional device comprising a nut 138 fixed to the slide 134, in which there engages a screw 139 rotatably mounted in the slide 137 and provided with a control wheel 140.

The slide 137 is able to slide in turn on the slideway 141, 142 in a direction perpendicular to the slideway 135, 136, the slideway 141, 142 forming part of a third slide 144. A screw 145 with a hand wheel 146 is rotatably mounted in the slide 144, and engages with a nut 147 fixed to the slide 137.

The slide 144 slides in turn on a slideway 141, 142 which moves on ball bearings on two rails 153, 154 in a direction parallel to the slideway 141, 142, the rails being carried by a support 155 which is secured, by means of screws 156, to a sleeve 157 which is fixed to a slide 158 able to slide on a vertical slideway 161, 162 secured to a plate 163 which is in turn attached to one end of the arm 17, the other end, as described above, being secured to one vertical face of a bracket 18, the horizontal face of which is secured flush with the upper part of the stock 1 of the machine.

The slide 158, which supports all the movable equipment on the machine on which is mounted the feeler 16 by means of a system comprising a nut 166 (FIGURE 13) fixed to a securing member 167 secured to the slide 158, and in which there engages a vertical rotating screw 169 which rotates in a casing 171 integral with the arm 17, may be moved upwards or downwards. To this end there rest successively against a shoulder 172 of the screw 169: the internal ring of a ball bearing 173, an intermediate ring 174 and the internal ring of a second ball bearing 175, pressure being exerted by a nut 176 mounted on a threaded portion 177 of the shaft of the feed screw 169. The external rings of the two bearings 173, 175 are lodged in a recess 179 in the sleeve 171, the external ring of the bearing 173 being held axially by means of two elastic keeper rings 181, 182, which are inserted in two corresponding annular grooves in the recess 179. At the upper end of the shaft of the feed screw 169 there is secured, by means of a pin 184, a cap 185 in the form of a hexagonal prism with a base flange 186, on which cap a box spanner may be engaged in order to turn the feed screw 169 in either direction to cause the slide 158 carrying the feeler holder to move upwards or downwards.

All the slides on the assembly on which the feeler is mounted are provided with suitable means for locking them in position, such as screws 187 and bearing discs 188 (FIGURES 12 and 14) for the upper slide 134 and similar screws 191 and bearing discs 192 to lock the slide 137, together with a system comprising a bolt 195 (FIGURES 12, 14 and 15), two thrust blocks (196, 197), a rib 198 secured to the support 155 and a rib 199 secured to the slide 144, which locks the said lower slide 144.

The movement of the feeler holder 16 in a direction which is horizontal and parallel to the plane of the facing head 59 and thus orthogonal to the axis of the spindle of the machine, is ensured by the movement of the slide 144 on its rails 153, 154 as a result of an axial movement of the boring spindle 117, and therefore synchronously with the movements of the facing head slide 66 which is driven through a short movement-transmitting linkage comprising a rack 203 (FIGURES 12 and 13) secured by means of screws 204 against a side face of the slide 144. A pinion 205, which meshes with the rack 203 is secured, preferably by a grooved sleeve joint 206 to the upper end of a vertical shaft 207 which is rotatably mounted in the casing 157 in two ball bearings 208, 209. The outer ring of the ball bearing 208 is held axially in position by means of an elastic keeper ring 211 lodged in an annular groove in the recess of the casing 157, while the outer ring of the bearing 209 rests on an inner shoulder 212 in the casing. The shaft 207 is held axially in position in the casing 157 by means of a shoulder 213 on the said shaft and an elastic keeper ring 214 which engages in an annular groove in the shaft and abuts against the side face of the inner ring of the upper ball bearing 208. The toothed pinion 205 is protected by a cap 216.

The lower end of the shaft 207 is connected, by means of a first cardan joint 221 (FIGURES 3 and 5) to the upper end of a telescopic coupling shaft shown at 222 and comprising an inner shaft 223 keyed slidably to a tubular shaft 224, the lower end of which is connected, by means of a second cardan joint 225 (see also FIGURE 7), to the upper end of a shaft 226 which is rotatable in two ball bearings 227, 228 in a casing 229 which is fixed by means of screws such as 231 in a vertical bored recess in a bush 232 on the side of the barrel 15 (see also FIGURE 6).

The lower splined portion of the shaft 226 is secured by means of an elastic keeper ring 234 to a toothed pinion 235 which meshes with a rack 236 cut in the external cylindrical face of a large ring 237 located within the barrel 15 in which there is also mounted another ring 241 which is capable of rotating in two conical roller bearings 238, 239 and is secured to the plate 116 which is fixed to the end of the boring spindle 117 of the machine by means of a key 243 (see also FIGURE 8) secured in a radial keyway in the ring 241 by means of a screw 245 at one of its ends while the other end is lodged in a keyway 246 in the rod 114 of the rack 111 so as to be locked between the keyway and the plate 116. The key 243 passes radially through a longitudinal groove 247 in the hollow spindle 23.

During assembly the position of the casing 229 in the bush 232 is adjusted in such a manner that the toothed pinion 235 engages without clearance in the rack 236 and the casing is then finally secured using screws 231 after it has been positioned by means of the fingers such as 231a.

The outer rings of the two conical roller bearings 238, 239 between which is held an intermediate ring 248, are held in place by means of an annular keeper ring 249 held against the face of the corresponding end of the ring 237 by means of screws 250 (FIGURE 8). The inner ring of the bearing abuts against a corresponding shoulder 251 on the ring 241 while the inner ring of the other bearing 238 is held, by means of a ring 252 with annular sealing grooves 252a, by a nut 253 screwed on to the threaded end of the ring 241. The nut 253 is locked by a screw 254 which abuts on a copper collar 255 in turn resting on the threads of the said ring. The degree of tightness of the nut 253 may be adjusted to regulate the pre-tensioning of the two conical roller bearings. Lubricant may be supplied to these bearings by means of a lubricator 261 (FIGURE 7) which is mounted in the ring 237 and which may be reached through a stopper member 262 screwed into the wall of the barrel 15.

The ring 237 is driven axially by a key 257 of a special shape as shown in FIGURES 6 and 7 which is secured to the barrel 15 by means of screws such as 258, the end of the key engaging in a longitudinal groove 259 (see also FIGURE 8) in the cylindrical outer surface of the ring 237 along a generatrix opposite the rack 236.

In the embodiment shown, the pinion 205 (FIGURE 12) which meshes with the rack 203 driving the feeler holder is of the same diameter as the pinion 235 which engages with the rack 236 connected to the feed control system for the radial feed of the facing head slide, so that the movements of the feeler holder and of the facing head slide are equal. The value of the ratio between these movements may be altered by making the pinions of different diameter.

The feeler holder 16 may be of any suitable conventional type and the feeler 11 is slidably mounted to move in the direction of the arrow F5 (FIGURES 3 and 4).

The template may, depending upon the purpose for which the machine is to be used, be a model part as shown at 12 in FIGURES 1 and 2 or a flat template as shown at 12a in FIGURES 3 and 4, in which case it will have a shape which matches that of the part of revolution which is to be cut on the part 10a.

As has already been stated above, the different mechanisms in the embodiment described have been designed so that the ratio between the movements of the feeler and those of the tool is 1:1, so that the dimensions of the template are equal to those of the corresponding portions of the parts to be machined.

The movements of the slide 6 which carries the workpiece holder and the template on the plate 7 which is integral with the floor plate 3 of the machine in the direction of the arrows f1 and f2 (FIGURE 2) are ensured by any suitable conventional control system (not shown), such as a screw and nut arrangement actuated by a servo mechanism shown diagrammatically at 265 (FIGURE 1), under the action of the feeler 11 which traces around the template 12. Chain-dotted lines 268, 269 indicate diagrammatically the connections between the servo mechanism 265 and the feed control for the slide 6 on the plate 7 and between the servo mechanism and the feeler respectively.

The mode of operation of the machine is as follows:

Let it be assumed that the machine is ready for operation, i.e., that the workpiece 10a is secured to its support 5, the upright column 2 is located on its bed 4 at a location such that the axis of the surface of revolution to be cut is located in the vertical plane containing the geometrical axis of the facing head, the slide 6 carrying the support 5 is in position on its plate at the location at which the cutting tool 84 (FIGURE 4) is ready to penetrate the workpiece 10a to commence cutting the shape 100. The stock 1 is located on the upright 2 in a position such that the axis of the machine spindle and the facing head 59 are at the height of the axis of the surface of revolution to be cut, the slide 158 (FIGURE 4) has been adjusted on the arm 17 to the height at which the feeler 11 is located at the level of the template 12 or 12a, while the composite slides 134 and 137 which support the feeler have been positioned to allow the feeler to trace around the template.

The milling spindle 41 of the machine (FIGURE 6) is rotated and causes the rotation of the hollow spindle 23 and the facing head 59 in which is mounted the slide 66 carrying the cutting tool 84. The traverse feed of the boring spindle 117 transmits through the rack 111, toothed pinions 101 and 91 and the rack 87 an equal radial feed to the facing head slide 66 which moves on the said facing head, while the boring head 117 transmits, through the key 243, ring 241, bearings 238, 239, ring 237, rack 236, toothed pinion 235, shaft 222 (FIGURE 3), pinion 205 (FIGURES 12 and 13) and rack 203, to the slide 144 which supports the movable assembly on which is mounted the feeler 11, a horizontal feed in the direction of the arrow F3 (FIGURE 4) at the same speed as the radial speed of the facing head slide which carries the tool. As the feeler traces around the template 12a it acts through the servo mechanism 265 and the connections 268 and 269 (FIGURE 1) the displacement in the direction and to the distance desired of the support 5 for the workpiece and template holders with respect to the stock 1 for which carries the facing head and the feeler, the movement thus produced being in the direction of the arrows f1 and f2 (FIGURE 2). The tool thus reproduces on the workpiece 10a the shape of the template 12a. Since the workpiece is not rotated, there is no risk that markedly eccentric portions of the workpiece might strike parts of the machine, thus making it impossible to machine the piece; nor is there any danger that the degree of precision with which the work is effected will be detrimentally affected by the imbalance produced by a workpiece which is asymmetric in rotation.

In the example shown, it has been assumed that the workpiece 10a is a support for injection nozzles of a spherically domed shape having four recesses identical with that shown at 100 (FIGURE 4), the converging axes of which meet on the axis of the dome. The workpiece support 5, which is of the type disclosed in the French patent specification mentioned above, enables each of the workpieces 10a, 10b, 10c, 10d to be successively positioned for machining, and each workpiece to be successively placed in each of the positions required for the cutting of the recesses shown at 100.

In the embodiments shown in FIGURES 16 and 17, the principle of operation for the copying process is the same as in the embodiment above described, except for the means which ensure the relative movement between the tool-supporting member and the template and the member which supports the tool and the feeler, under the control of the feeler.

In the embodiment shown in FIGURE 16, the workpiece 272 and the template 273 are held against a bracket 274 which is secured to the floor plate 3 of the combined milling and boring machine, while the stock 1a, which carries the tool and the feeler, is able to slide horizontally in a direction F6, F7 parallel to the axis of the spindle and the facing head on a plate 276 slidably mounted on an upright column 2a of the machine. The feeler 11 acts through a connection 277 to control the movements of the stock 1a on its plate 276. All the other movements are the same as those described for the embodiment shown in FIGURES 1 and 2.

Finally, in the embodiment shown in FIGURE 17, the workpiece 272 and the template 273 are supported on a bracket 274 secured to the floor plate 3 of the machine as shown in FIGURE 16 and the stock 1, which carries the tool and the feeler, slides directly on the upright column 2b, as is the case in the embodiment shown in FIGURES 1 and 2, the relative movement controlled by the feeler 11 through the connection 281 then being the movement of the upright column 2b on a plate 278 in the direction of the arrows F6, F7. The initial position of the stock 1 relatively to the bracket 274 may then be adjusted by moving the plate 278 on a bed 279 with a horizontal slideway perpendicular to the direction of the arrows F6 and F7. The machining process is always the same.

In the embodiment shown, the diameters of the various pinions are such that the ratio of the movements of the feeler holder and the radial facing head is equal to 1:1, i.e., the template is of the same dimensions as the workpiece. However, by varying the diameters of the pinions this ratio may be varied as desired so that it is possible to use templates which are either smaller or larger than the workpiece, if so desired.

I claim:

1. A machine tool for copying parts of revolution, said machine comprising a first supporting member on which are mounted a facing head with a facing head slide which advances radially over the said plate, and a movable support for a feeler which moves on the first supporting member in a direction orthogonal to the axis of said facing head; a second supporting member for supporting both a part which may be machined by a tool carried by said facing head slide and a template which may be traced by said feeler, said first and second supporting members being movable with respect to each other in a direction parallel to the axis of said facing head; means for ensuring the radial feed movement of said facing head slide together with a mechanical connection means between said feeler holder and said means controlling the radial feed of said facing head slide, and means for ensuring the relative movement of said two supporting members in an appropriate direction in response to the impulsed movements received by said feeler as it traces around said template during the movement effected by said feeler holder synchronously with the radial feed movement of said facing head slide.

2. A machine tool according to claim 1, where the machine tool consists in a combined milling and boring machine with a horizontal spindle coupled to said facing head, wherein said first supporting member is constituted by said spindle head while said second supporting member is constituted by a floor plate.

3. A machine tool according to claim 2, wherein said second supporting member is constituted by a plate which is movable on said floor plate in a direction parallel to the axis of said spindle.

4. A machine tool according to claim 2, where said machine tool is a combined milling and boring machine, having a spindle head able to move horizontally in a direction parallel to the axis of the spindle on a plate which slides on an upright column, wherein said second supporting member is mounted in a fixed position on said floor plate.

5. A machine tool according to claim 2, where said machine tool comprises a spindle head which is mounted so as vertically to slide on an upright column which is itself able to slide horizontally on a slideway parallel to the direction of the machine spindle, wherein said second supporting member is mounted in a fixed position on said floor plate.

6. A machine tool according to claim 1, wherein said feeler holder is mounted on a slide which is able to move on a slideway extending in a direction orthogonal to the axis of said facing head and which is provided with a rack engaging with a pinion mounted at one end of a cardan shaft, the other end of which carries another pinion which is similarly toothed and engages with a rack connected to a member which forms part of said means controlling the radial feed movement of said facing head slide.

7. A machine tool according to claim 6, wherein said member controlling the radial feed movement of said facing head slide is the boring head of the machine.

References Cited

UNITED STATES PATENTS 2,883,912   4/1959   Billman et al. _____ 90—13

GERALD A. DOST, *Primary Examiner.*